Oct. 6, 1936.   W. F. NEWHOUSE   2,056,734
MACHINERY FOR MAKING BASKETS
Original Filed April 30, 1932   5 Sheets-Sheet 1

Inventor
Walter F. Newhouse
By Arthur F. Durand   Atty.

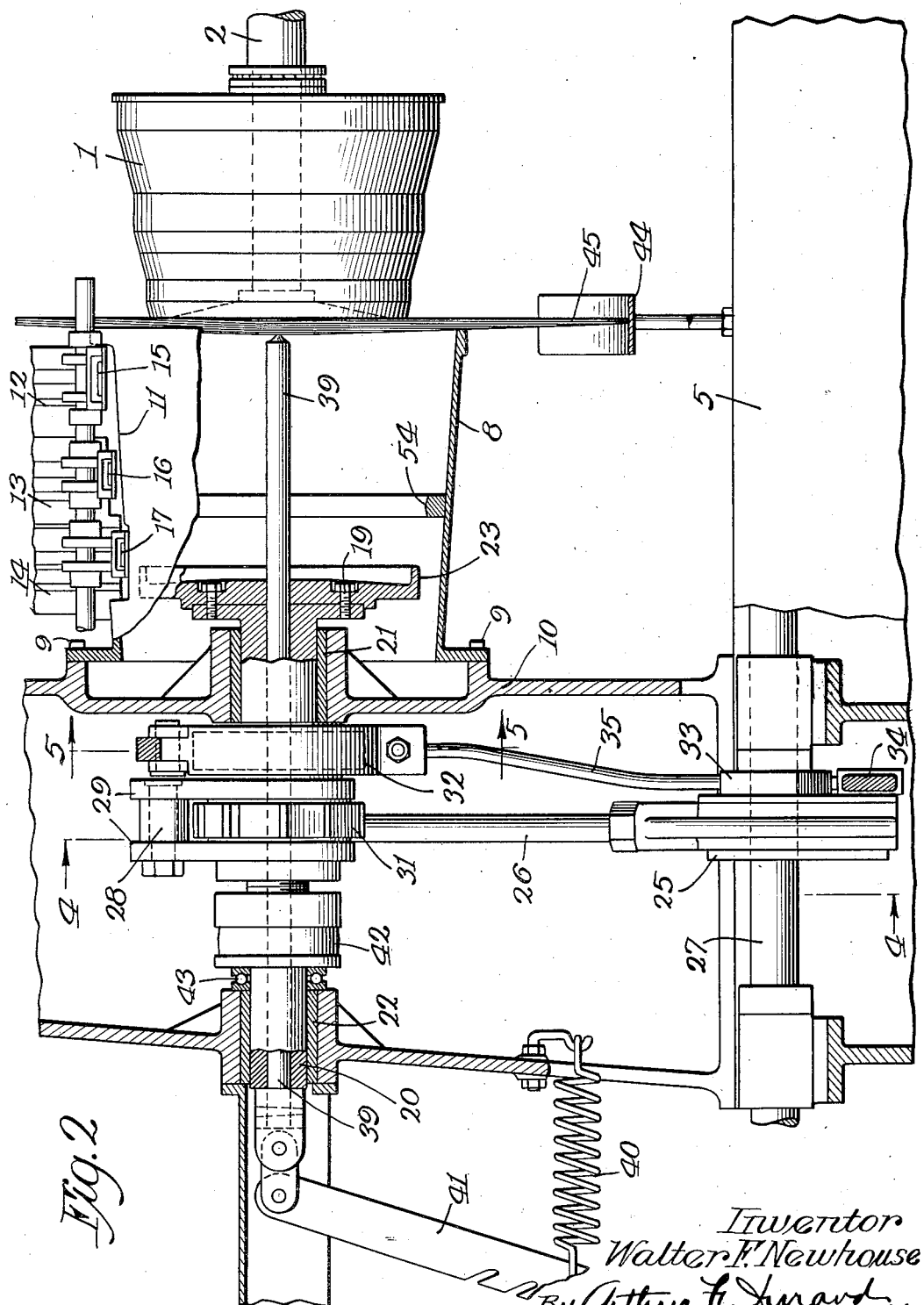

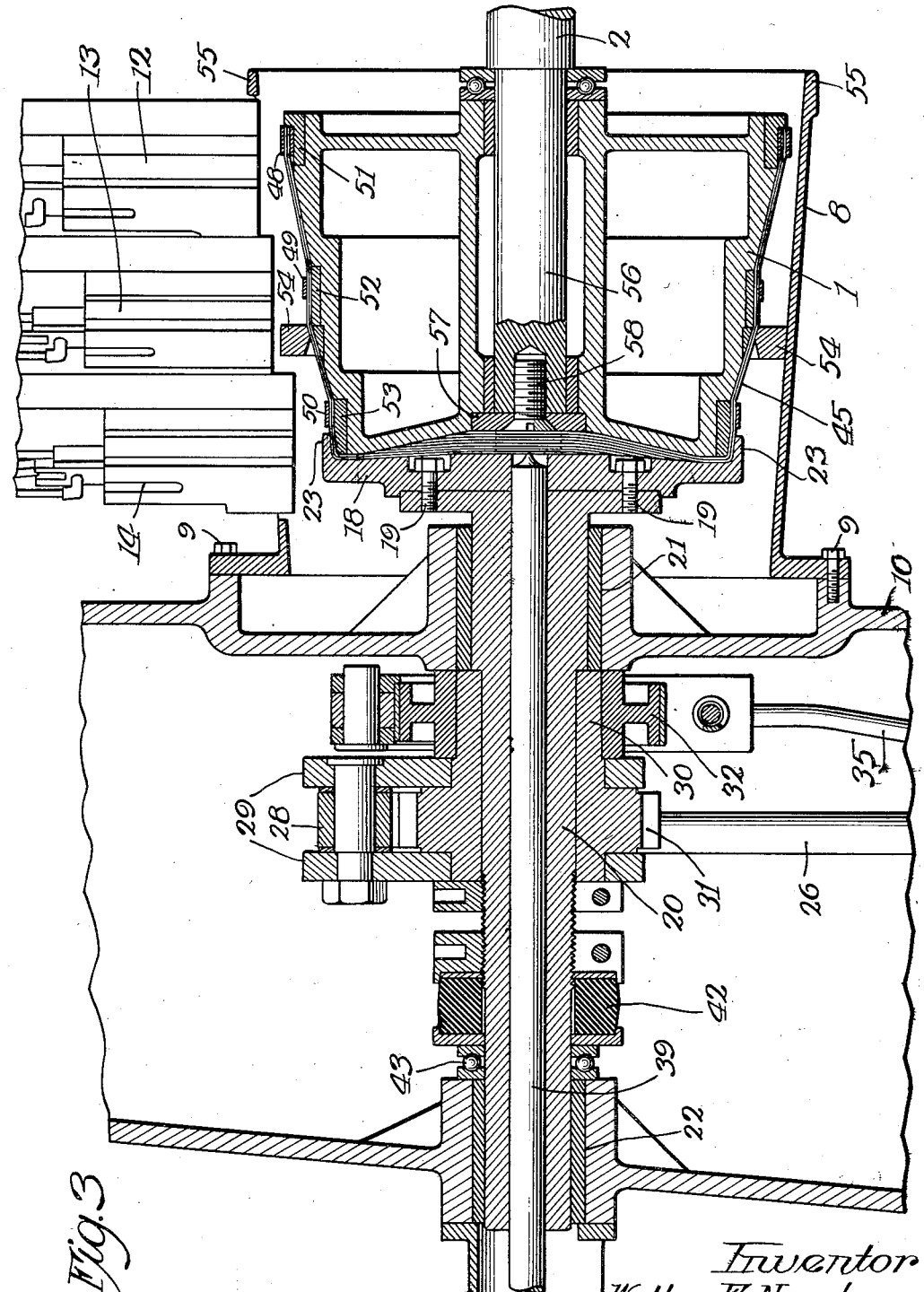

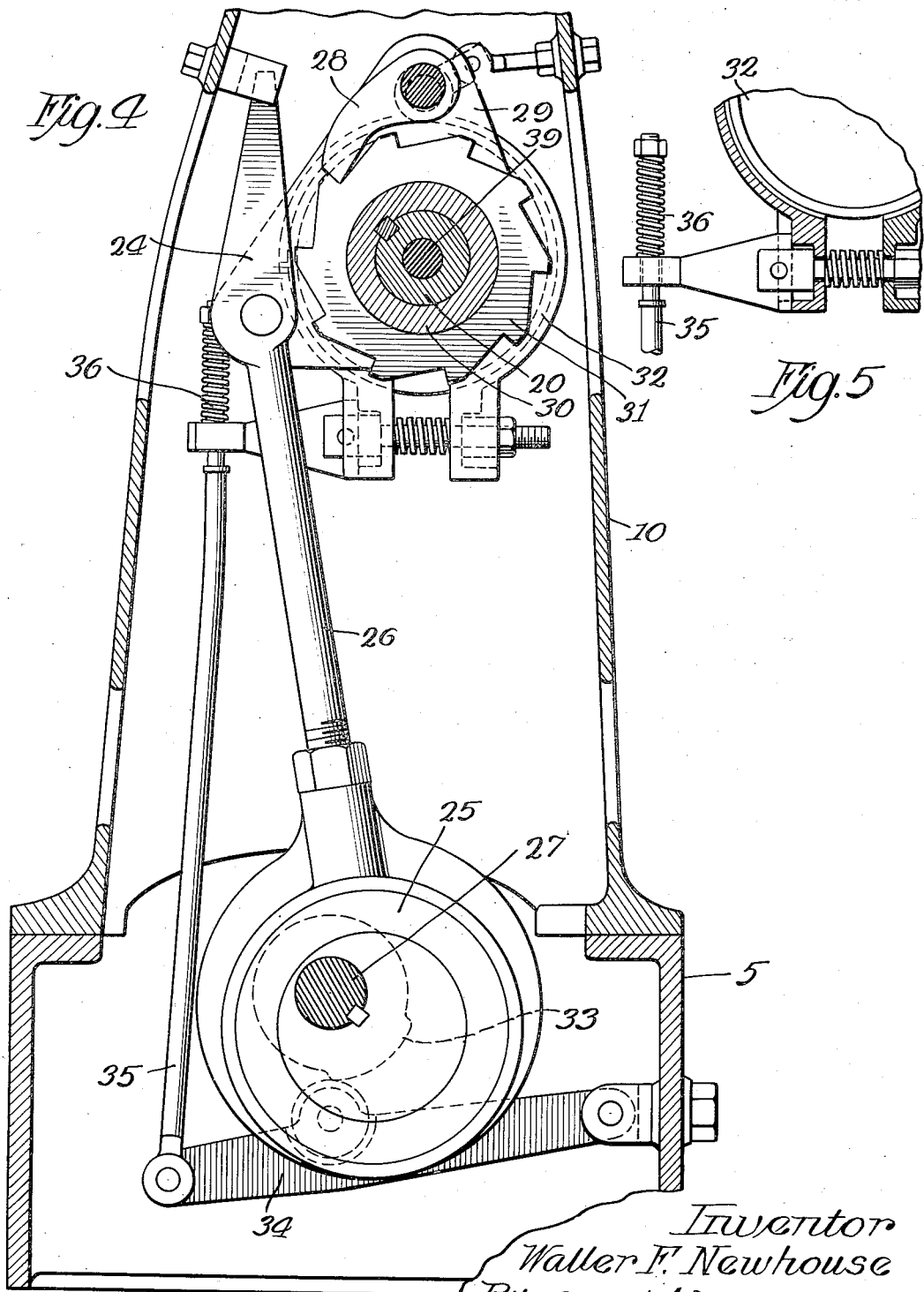

Oct. 6, 1936.   W. F. NEWHOUSE   2,056,734
MACHINERY FOR MAKING BASKETS
Original Filed April 30, 1932   5 Sheets-Sheet 5
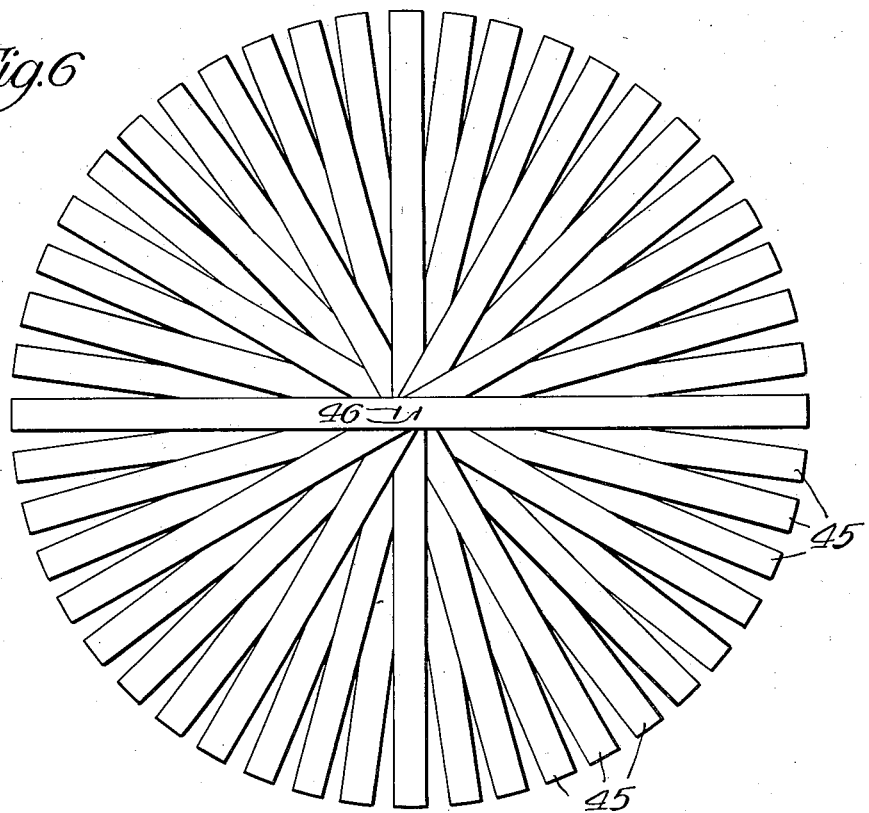
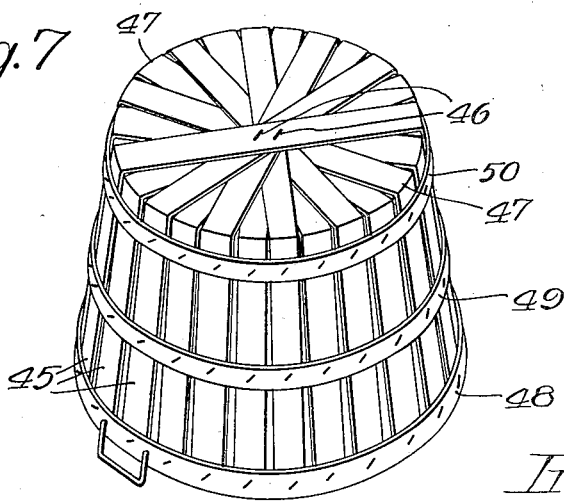
Inventor
Walter F. Newhouse
By Arthur F. Durand
Atty Patented Oct. 6, 1936

2,056,734

UNITED STATES PATENT OFFICE 2,056,734

MACHINERY FOR MAKING BASKETS

Walter F. Newhouse, Benton Harbor, Mich.

Application April 30, 1932, Serial No. 608,438
Renewed July 29, 1935

13 Claims. (Cl. 147—47)

This invention relates to machinery for making baskets, and more particularly machinery for making what are commonly called straight-side bushel or half bushel baskets. Baskets of this kind have substantially straight and downwardly tapered sides, and a substantially flat or slightly arched bottom.

Generally stated, the object of the invention is to provide a novel and improved construction and arrangement, in a machine of this general character, whereby a basket of this kind is made with its outside bottom hoop disposed a distance above the lower edge of the basket, whereby this lower edge may be formed sharply and held firmly in the shape desired, by the forming elements of the machine, while the said bottom hoop and the other hoops of the basket are being stapled in place around the outside of the basket.

It is also an object to provide certain details and features of construction and combinations tending to increase the general efficiency and the desirability of a basket making machine of this particular character.

To the foregoing and other useful ends the invention consists in matters hereinafter set forth and claimed and shown in the accompanying drawings, in which—

Fig. 2 is an enlarged longitudinal section of said machine, showing the basket forming and stapling portion of the machine, with certain other portions shown broken away for convenience in illustration, and with other portions shown in side elevation;

Fig. 3 is a similar longitudinal section, on a larger scale, showing the basket forming elements in a different position;

Fig. 4 is an enlarged vertical transverse section on line 4—4 in Fig. 2 of the drawings;

Fig. 5 is a similar section on line 5—5 in Fig. 2 of the drawings;

Fig. 6 is a plan view of the web or mat which forms a sort of blank from which the basket is made; and Fig 7 is an up-side-down perspective view of the finished basket.

Figure 1:
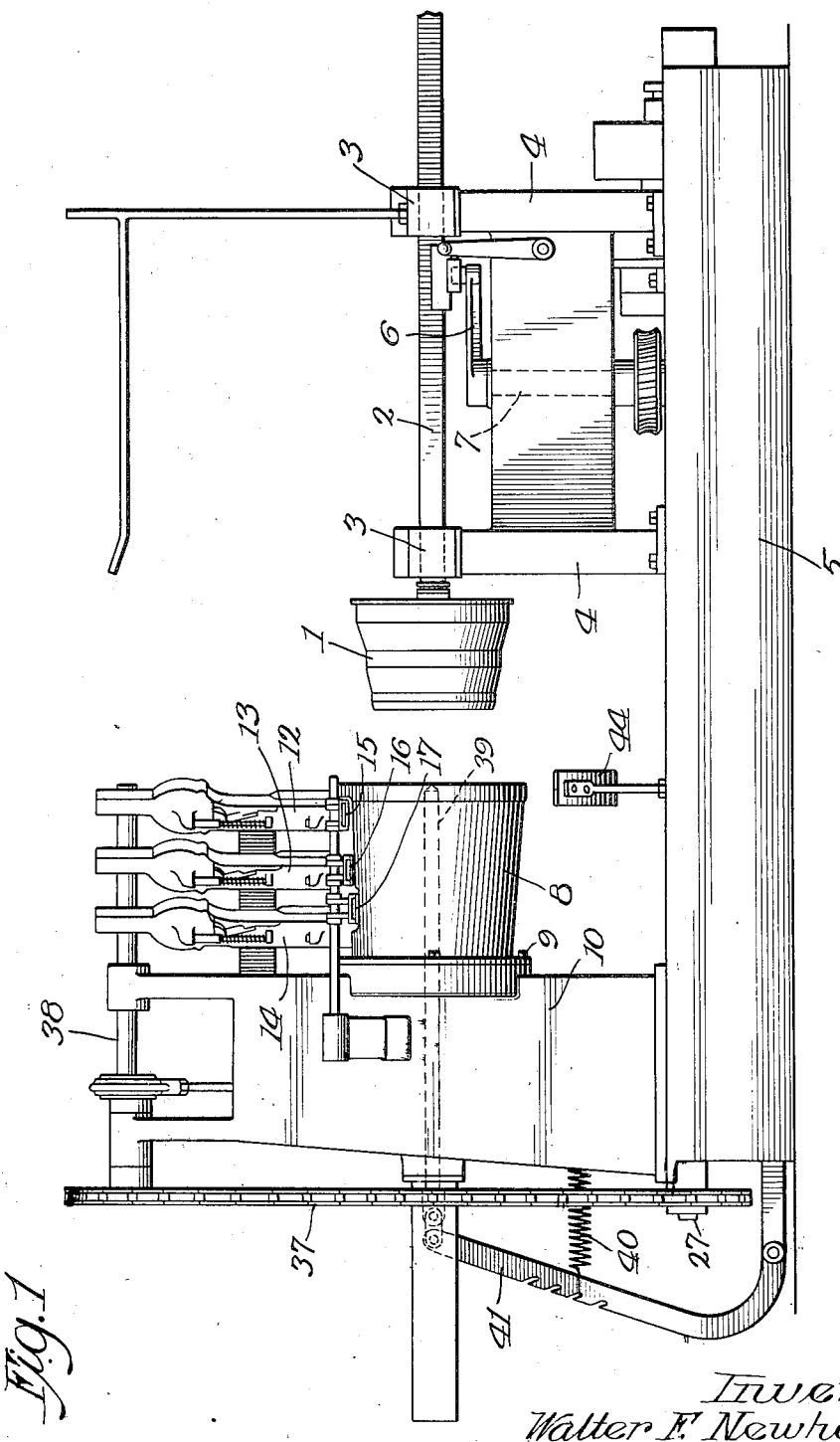
Fig. 1 is a side elevation of a basket making machine embodying the principles of the invention.

As thus illustrated the invention comprises an inside basket form 1 mounted on the end of the endwise movable bar 2, which latter is slidable endwise in the bearings 3 provided on the tops of the supports 4, which latter are suitably mounted at their lower ends on the base 5 of the machine. The inside basket form 1 is tapered to fit the interor of the basket, and is rotatably mounted upon the end of the bar 2, whereby this form will rotate with the basket materials, as will hereinafter more fully appear. Any suitable or desired mechanism may be employed to reciprocate the bar 2, in properly timed relation to the other elements of the basket forming instrumentalities. The crankarm connection 6 on the upper end of the vertically disposed shaft 7 constitutes a well-known form of mechanism for this purpose and does not need further description.

The outside basket form 8 is also tapered, in order to properly taper the exterior of the basket, and is rigidly mounted or secured by bolts 9 upon the body frame 10 of the machine. At its upper side, the stationary outside basket form 8 is cut away at 11, thereby to provide an opening through which the three staplers 12, 13, and 14 may insert the staples into the basket materials. These staplers have hoop guides 15, 16, and 17 respectively for guiding the three outside hoops of the basket, through the opening 11, in position to be stapled to the side walls of the basket. These staplers and the hoop guides are old and well-known, and do not require further description.

Referring more particularly to Fig. 3 of the drawings, it will be seen that the basket bottom forming clamp 18 is rigidly and detachably secured by bolts 19 to the hollow rotary shaft 20, which latter is mounted to rotate in the bearings 21 and 22 provided on the body frame of the machine. The basket bottom forming clamp 18 is provided with a peripheral flange 23 that extends a distance over and upon the smaller or tapered end of the inside basket form 1, when the latter is moved into co-operative relation to the outside basket form 8 and to the basket bottom forming clamp 18, as shown in Fig. 3 of the drawings. The shaft 20 can be rotated in any suitable or desired manner, the ratchet mechanism 24, operated by the eccentric device 25 through the medium of the pitman 26, it will be observed, being an old and well-known form of mechanism for this purpose, said eccentric being mounted on the longitudinal power shaft 27, which latter is suitably mounted on the body frame of the machine. It will be seen that the pawl 28 is mounted on the plate 29 which oscillates about the axis of the shaft 20 and the intermittent feed mechanism thus provided, for intermittently rotating the basket and the basket forming instrumentalities, is old and well-known, and does not need further description. The hub portion 30 of the ratchet wheel 31, which latter is suitably fastened to the shaft 20, has a band brake 32 thereon, operated automatically by the cam 33 on the shaft 27, through the medium of the arm 34 and the rod 35, the latter having a yielding spring connection 36 with the said band brake device, as shown more clearly in Figs. 4 and 5 of the drawings. The band brake operates, in a well-known manner, to prevent overthrow of the ratchet feed device, thereby to stop the rotation of the basket and basket forming instrumentalities accurately, each time, in position to receive the staples from the three single or double staplers.

The shaft 27 is connected by a sprocket chain 37 with the overhead shaft 38 which is provided for operating the three staplers, in a well-known manner, whereby these three staplers are actuated in unison, to drive three staples, each time that the basket materials and the basket forming instrumentalities are stopped and held against rotation momentarily.

As shown in Figs. 1, 2, and 3, the hollow shaft 20 contains an endwise movable rod 39, operated automatically by a spring 40 through the medium of an arm 41, to not only expel the finished basket from the stationary form 8, when the axially movable form 1 is pulled back into normal position, but to also form the concave bottom first and hold it in position before the flange 23 bends the staves over the form 1 as shown. This prevents breakage of the staves at the points where they are bent. For this purpose the end of the rod 39 has a sharp point as shown, to pierce and hold the bottom in exact position. But it will be seen, of course, that the face of the clamp 18 is convex, and this formation co-operates with the concave end of the form, to maintain the arched formation of the bottom while the hoops are being fastened in place.

Also, in a machine of this character, it is desirable to provide a rubber cushion or bumper device 42, on the hollow shaft 20, with a thrust bearing 43 interposed between this cushion and the adjacent bearing 22, in order to take up the shock or impact and compensate for different thicknesses of the materials between the form 1 and the slightly convex basket bottom clamp or form 18, when the form 1 is pushed into operative position as shown in Fig. 3 of the drawings.

In addition, a gauge 44, of well-known character, is provided for positioning the web or mat shown in Fig. 6 of the drawings, in position in front of the mouth or large open end of the form 8, in position to be accurately pushed into the form 8 by the form 1, when the latter is caused to move axially into position as shown in Fig. 3 of the drawings.

The basket to be made, as shown in Fig. 7 of the drawings, is composed of the staves 45, first formed into a mat or web, as shown in Fig. 6 of the drawings, disposed cross-wise at their centers, and having staples 46 inserted through the different superposed layers, to hold the staves in proper relation to each other. The basket when formed has a substantially flat bottom when the basket is raised from the side, which is substantially convex on its upper side, and preferably slightly concave on its lower side. The basket forming instrumentalities shown and described, including the bottom forming flange 23, bend the staves sharply and form the basket with a well defined lower edge 47 as shown in Fig. 7 of the drawings. The three outside hoops 48, 49, and 50 are stapled to the side walls of the basket, formed by the end portions of the staves, by the staplers 12, 13, and 14 respectively. It will be seen that the bottom hoop 50 is disposed a distance from the edge 47, so that this hoop, when the basket is right-side up, is a distance above the said bottom edge of the basket. Advantageously, it will be seen, the hoop 50 is stapled in place while the flange 23 is performing its function of holding the bent portions of the staves in accurate position, whereby the bottom of the basket and the lower portions of the side walls thereof are tightly clamped between the tapered or smaller end of the form 1 and the clamp or form 18, while the hoop 50 is being wound around the basket and stapled in place, and while the hoops 48 and 49 are also being stapled in place. In this way, the hoop 50 is secured in place sufficiently close to the lower edge of the basket, it will be seen, to maintain the crowned or concave or convex formation of the bottom, but at the same time, this hoop is stapled in place a substantial distance from the bottom edge of the basket, thereby permitting the tight clamping and holding of not only the bottom of the basket, but also of the adjacent lower portions of the side walls of the basket, while the said bottom hoop and the other two hoops are being stapled to the side walls of the basket. In this way, the clamping and bottom forming member 18 takes a strong, positive, and very firm grip on the sides of the basket, as well as on the bottom of the basket, thereby to rotate the basket and the inside basket form 1 in the desired manner, without any danger of slippage between the friction-like driving connection thus provided between the power transmitting connections and the basket itself.

The three rings 51, 52, and 53 may be provided with cylindrical peripheries, to clinch the staples inserted through the three hoops, if it is desired to form the hoops cylindrically. However, it is possible to form these hoops with the same taper that the basket sides have, when the basket is finished, and in that event the rings may have a slight taper on their outer peripheries, conforming in effect to the taper of the basket itself.

If desired, the ring 54 may be mounted in the stationary form 8, to engage the staves of the side walls of the basket, in the manner shown in Fig. 3 of the drawings, thereby to assist in bending the staves tightly against the sides of the form 1 when the latter is pushed into the outside form 8, thus holding the staves tightly in place and preventing fraying thereof during the operation of stapling the materials together. This ring 54 can be rigid with the form 8, or it may be mounted to rotate with the basket. It will be understood, of course, that the outer continuous unbroken periphery 55 of the outer or larger end of the form 8, as shown more clearly in Fig. 3 of the drawings, constitutes the first means for bending the staves against the sides of the form 1, when the latter is pushed forward; that the ring 54 then still further serves to press the staves against the sides of the form 1; and that the flange 23 finally clamps the lower portions of the side walls of the basket firmly against the tapered portion of the ring 53, thereby providing a series of successive bending and clamping operations that result finally in a very accurate formation of the basket, particularly the bottom structure thereof, and in a very firm gripping of the basket and the inside form 1 by the bottom clamp or forming member 18, thereby to positively rotate the basket during the stapling operation, in the manner previously described.

Of course, the staves can be scored at the points where the bottom edge 47 of the basket is to be formed, to make them bend more easily, but this is not necessary, for by steaming or properly preparing the staves, which are ordinarily made of thin veneer, they can be made to bend sharply, without breaking the fiber, thereby to provide a substantially sharp, slightly rounded edge without any breakage of the staves at any point therein. Thus a strong and properly formed bottom is provided for the basket, inasmuch as all the stapling for the three hoops is done while not only the bottom but also the adjacent portions of the side walls are tightly clamped and held in proper shape and condition, against slippage, thereby ensuring a proper rotation of the basket during the stapling operation, from which an ultimate bottom construction of strong and satisfactory character results.

As shown more clearly in Fig. 3, the inside basket form 1 is preferably removable from the end portion 56 of the bar 2, whereon it is mounted for rotation, by means of a retaining plate 57 which engages the form 1 at its edges and which is removably held in place by a screw 58 inserted in a threaded bore in the end of the portion 56 upon which the form is mounted.

It will be understood that when the basket is removed from the machine, the side walls will have a substantially straight and continuous taper from top to bottom thereof, in general effect, even though the three hoops are cylindrical, instead of being tapered.

It will be understood, very readily, that if the bottom of the basket were not formed first, by arching it in the desired manner, before the operation of the engaging means 23, in the manner shown and described, there would be danger of breakage of the materials along the annular line of junction between the bottom and sides of the basket. For example, if the engaging means 23 were permitted to operate first, and the pusher rod 39 afterward, there would be danger of pulling the bottom of the basket away from the sides of the basket and this danger is obviated by the operation of the rod 39 first and the operation of the engaging means 23 afterward, in the maner shown and described.

It will be seen that the flange 23 is slightly tapered or beveled inside, in conformity with the bevel of the lower portion of the ring 53, whereby the side walls of the basket are tightly gripped between the flange and ring, when the plate 18 clamps the bottom portions of the staves against the end of the form 1, as shown in Fig. 3 of the drawings. Thus, the ring 53 has a straight or cylindrical portion forming a backing for the hoop 50, when the latter is stapled in place, and has a tapered or beveled lower portion to cooperate with the interiorly tapered flange 23 of the clamping plate 18, which latter thereby not only grips the bottom of the basket, by pressing it tightly against the end of the form, but also grips the sides of the basket, thereby to rotate the basket and the form 1 during the stapling of the hoops in place. In this way, it is the flange 23 that actually makes the break in the staves, at the lower corner 47 of the basket, and not the stapling of the hoop 50 in place. Therefore, a clean sharp bend or break is made in the staves, clear around the bottom of the basket, preliminary to the stapling of the hoop 50 in place, and preliminary to any stapling of the hoops whatever. Therefore, the stapler 14 is not relied upon to produce the break or sharp bend in the staves, for this is done entirely by the bottom clamp that serves also to rotate the basket and the inside basket form.

Thus the machine is specifically for making inverted or frusto-conical baskets, either bushel baskets or half-bushel baskets, or baskets of other capacities, which in side elevation have straight downwardly tapered sides and a flat top and bottom, but with the bottom wall preferably arched or bulged upwardly on its upper side.

As stated, the machine parts themselves are operative to bend the splints or staves sharply over the annular edge of the form, and the bottom hoop is thereafter stapled in place upon splints or staves that are already held snugly against the sides of the tapered basket form. Therefore, the raised bottom hoop provisions of the machine are not like those for attaching the lower hoop to a round bottom basket, nor are they like those for attaching a bottom hoop flush with the bottom of an ordinary straight-side basket, for the problem is inherently and necessarily different in the machine shown and described.

It is found in practice that a basket having practically conical or tapered sides from top to bottom, with the tapered or conical formation terminating below the bottom hoop, is better adapted for service, and that they nest more snugly together when shipped empty. In fact, with the formation of the basket shown and described, a plurality of these baskets are adapted to practically nest bottom to bottom, or at least with the bottoms quite close together. Again, the formation of the basket is such that the arched bottom wall does not tend to sag when the basket is loaded, as such action is resisted by the bottom hoop and by the taper of the side walls just below the bottom hoop. In addition, the beveled or conical formation of the ring 53, and of the interior of the flange 23, and the consequent tight gripping of the side walls of the basket tend to prevent undue breakage of the staves at the lower corner of the basket, tending instead to insure a comparatively sharp but nevertheless well-rounded corner in which the fiber of the wood staves is practically unweakened by breakage. In fact, the staves are molded into shape around the bottom of the basket, and in the side walls immediately below the bottom hoop, in such a manner that this molded lower end of the basket tends more effectively to retain its given shape or form, and any tendency towards deformation of the lower end of the basket in use is of such character that the arched formation of the bottom wall is more effectively maintained.

Furthermore, and notwithstanding the use of the ring 54 to flatten the staves against the rotary form 1, the grip of the tapered flange 23 upon the tapered lower end of the basket, as well as the grip of the clamp 18 against or upon practically the entire bottom of the basket, is so great and so positive that there is no danger of slippage between the clamp 18 and the basket, and in this way the feed is positive and accurate, and the staples are properly placed on the hoops. In this connection it will also be seen that the bolts 19, which secure the clamp 18 to the disk which is integral with the end of the shaft 20, have their heads countersunk on the face of the cup-shaped clamp plate 18, thereby to prevent said heads from injuring the bottom of the basket.

What I claim as my invention is:

1. In a machine for making baskets of the kind that have a practically flat bottom and side walls tapering downwardly to the lower corner of the basket, when the basket is viewed in side elevation, with top and bottom and middle hoops therefor, the bottom hoop being disposed a relatively short distance above the corner of the bottom, the combination of a tapered rotary form for engaging the inner surface of the side walls and bottom of the basket, tapered around its smaller end to fit the taper of the side walls below said bottom hoop, the form being concave at its smaller end, a rotary plate having a face projection serving as a clamp for pressing the bottom of the basket against the concave end of the form, an annular flange on said clamp, said flange being tapered on its inner surface to firmly grip the tapered side walls of the basket adjacent the lower corner thereof, co-operating with the face of said plate to arch the bottom of the basket, means for causing rotation of the form and clamp in unison, and means for attaching said outer hoops to the basket, including the attaching of said bottom hoop adjacent the edge of said flange, while the latter tightly grips the side walls of the basket, tending to maintain the arched formation of said bottom.

2. A structure as specified in claim 1, said plate being convex on its face to press the basket bottom into the concave end of the form, whereby the entire end of the bottom of the basket is subject to clamping pressure, as well as all portions of the side walls of the basket immediately adjacent said bottom.

3. A structure as specified in claim 1, said means for causing the form and clamp to rotate in unison comprising a feed device for rotating the clamp, and for thereby rotating the basket and form, the clamp using practically its entire face and the entire inner surface of said flange to obtain a firm and positive grip on the basket, without engaging the bottom hoop, and through the bottom and tapered walls of the latter upon said form, whereby the basket and form are positively rotated for the attachment of said hoops thereto.

4. A structure as specified in claim 1, said form having three cylindrical rings where said hoops are attached to make the hoops cylindrical but the ring where the bottom hoop is attached having a tapered portion corresponding to and co-operating with the taper of said flange, so that the thinner edge of this ring holds the bottom corner portion of the basket tightly against said flange and the adjacent face of the clamp.

5. In a machine of the character described, for making downwardly tapered baskets of the kind that have a bottom corner where the sides join the upwardly convex bottom, with a bottom hoop to maintain the corner and bottom formation, comprising a tapered basket form mounted to rotate about its axis, provided at its smaller end with an annular edge to form said bottom corner of the basket, having a recess in its smaller end, rotary clamping means for pressing the staves of a mat into said recess, whereby the inner surface of the basket bottom is engaged by some surface of said recess, thereby in effect to arch the bottom of the basket, and to provide a rotating grip on the basket bottom, means in effect forming an unbroken ring having its inner periphery tapered to correspond to the taper of the adjacent smaller end of said form, with the ring taper diameter only the thickness of the staves greater than the diameter of said end taper of the form, serving to fully bend the staves over said annular edge and against the tapered sides of the smaller end of said form, means for causing relative axial movement of said form and ring and clamping means, to bend the mat into basket shape on said form, with the staves conforming to the tapered space between said ring and the smaller end of the form, and for thereafter releasing the basket from said ring and clamping means, means for causing rotation of the form and basket sides and bottom thus held in basket form, means for guiding a bottom hoop strip onto the basket adjacent the circular edge of said ring, during the rotation of the basket, close enough to the basket bottom to maintain the latter convex on its upper side when the basket is removed from the machine, means for simultaneously guiding other hoop strips onto the basket, and staplers for simultaneously fastening all of said hoop strips to the sides of the basket, to form encircling top and bottom and middle hoops therefor, all complete before said release of the basket bottom from said ring and clamping means.

6. A structure as specified in claim 5, said ring being a part of said means for causing rotation of the form and thereby serving as a power transmission element for rotating the basket and the form in unison therewith.

7. A structure as specified in claim 5, said clamping means being mounted to rotate in unison with said form, while against the basket bottom, with the latter and said ring in a common plane.

8. A structure as specified in claim 5, said ring having said clamping means rigid therewith to clamp the basket bottom against the form.

9. A structure as specified in claim 5, said ring being mounted to rotate in unison with said form, while tightly gripping said basket bottom corner, with said ring and basket bottom in a common plane.

10. In a machine of the character described, for making a so-called straight side bushel or half-bushel basket having a practically flat bottom that is convex on its upper surface, with a distinct corner between the bottom and downwardly tapered sides of the basket, a tapered basket form having an annular bottom edge at its smaller end, the latter being concave to crown the basket bottom, supported to rotate about a horizontal axis, means in effect forming an annular ring supported in axial alignment with said form and having its inner periphery shaped and tapered to press and conform the staves of a basket mat against and to said edge, and against and to the adjacent bottom and side surfaces of said form, so that these portions of the staves are subject to compressive action between the ring and the said edge and adjacent bottom and side surfaces of the smaller end of the form, thereby to provide the basket with an annular exposed bottom corner formed by the abrupt bend or break in the staves where they are bent over said edge, means to support said ring with its axis in fixed alignment with the axis of said form, means for causing relative axial movement between the form and said ring to press the staves tightly around said edge, to fully form said corner, and to thereafter release the basket from said ring, the machine having a clamping surface to press the staves into the concave end of the form, and mechanism supported in fixed position above the form, when the latter is subject to the pressure of said ring, for stapling the basket together before its release from said ring, while said basket bottom corner is tightly gripped by said ring including a stapler in position to fasten a third or bottom hoop around the basket adjacent the edge of said ring whereby said stapler and said ring and clamping surface co-operate in the fastening of said bottom hoop in place in a manner to perpetuate the crown of the bottom after the basket is released from the machine.

11. A structure as specified in claim 10, comprising means for communicating driving power to said ring to rotate the basket in unison with said form, by a compressive grip on said bottom corner.

12. A structure as specified in claim 5, said ring and clamping means being rotatable in unison with the basket, with said ring and basket bottom in a common plane.

13. A structure as specified in claim 5, having an annular member spaced from said ring for pressing the staves against the form between the bottom and middle hoops, while said ring grips the basket bottom corner, and a larger ring in position a distance from said annular member to initially bend the staves over the edge of the form, preliminary to the final bending by said ring.

WALTER F. NEWHOUSE.